June 4, 1968 R. E. SKOCHDOPOLE ET AL 3,386,877
CELLULAR THERMOPLASTIC ARTICLE HAVING SELECTED OPEN CELLS AND ITS MANUFACTURE
Filed Nov. 2, 1964
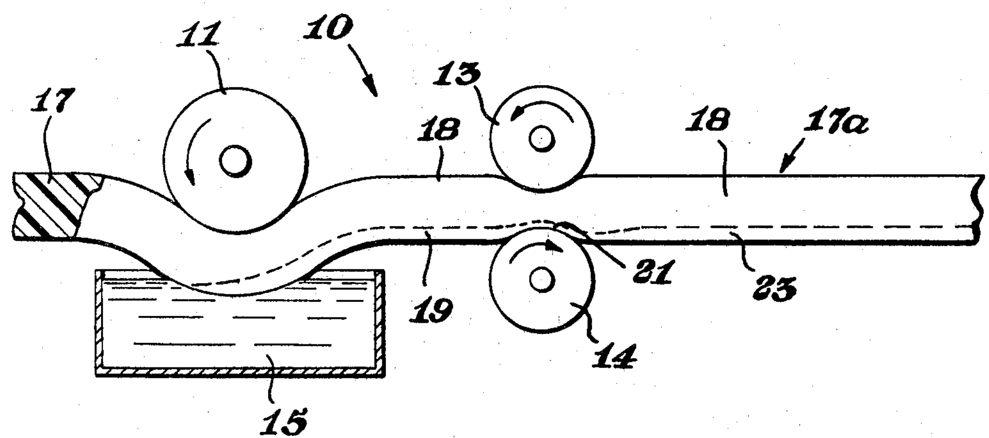
INVENTORS.
Richard E. Skochdopole
Demetrius Urchick
BY Robert B. Ingraham AGENT
ATTORNEY 3,386,877

CELLULAR THERMOPLASTIC ARTICLE HAVING SELECTED OPEN CELLS AND ITS MANUFACTURE

Richard E. Skochdopole and Demetrius Urchick, Midland, Mich., assignors to The Dow Chemical Company, Midland, Mich., a corporation of Delaware Filed Nov. 2, 1964, Ser. No. 408,257
9 Claims. (Cl. 161—160)

ABSTRACT OF THE DISCLOSURE

Foam bodies having open cell and closed-cell portions are obtained from a closed-cell foam by maintaining the portion which is to have closed cells at a temperature above the second order transition point of the foamed polymer, maintaining the portion which is to have open cells at a temperature at least 20° C. below the second order transition point and crushing the foam to selectively provide at least two zones, one having open cells, the remaining zone having closed cells.

This invention relates to foamed resinous articles and their manufacture. It more readily relates to modified foamed resins having both open cell and closed cell structures and the manufacture of these resins.

Oftentimes such polymers are utilized to form cellular or foam structures usually of the closed cell variety. Closed cell foams may be ruptured to give desirable articles which are porous and reusable for a variety of purposes including filters, sponges, applicators, padding, and the like. Oftentimes it is desired to give a composite article having both closed cell and open cell structure. Usually such structures are fabricated by the lamination of an open cell foam to a close cell foam. Oftentimes the lamination is accomplished by means of various adhesives or heat sealing and thereby provides an undesirable region within the foam that is relatively rigid and is an obvious "glue" line.

It is an object of this invention to provide a composite foamed polyolefin article having open cells and closed cells without the necessity of laminating two foamed bodies.

Another object of this invention is to provide a method of selectively rupturing a portion of the cells in a foamed resinous body.

A further object of the invention is to provide a method of rupturing selectively closed celled foams in an easily controllable and predetermined manner to provide a foamed resinous body having a layer of open cell structure and a layer of closed cell structure adjacent to each other and prepared from a common closed cell foam body.

These benefits and other advantages in accordance with the present invention are achieved by selectively varying the temperature of at least a first portion of a resinous foamed body having a second order transition point and a plurality of closed cells having cell walls to a temperature below its second order transition point (glass temperature) compressing the body and rupturing cell walls of the first portion of the foam body while maintaining at least a second portion of the body above its second order transition point and not rupturing a major portion of the cell walls thereof.

Further features and advantages of the present invention will become more apparent from the following specification when taken in connection with the drawing wherein the figure schematically represents the product and process of the invention.

The figure schematically depicts an apparatus generally designated by the reference numeral 10. The apparatus 10 comprises in cooperative combination guide roll 11, a pair of crushing rolls 13 and 14, a heat transfer means or bath 15, and a thermoplastic resinous closed cell foam sheet or slab 17. The foam slab 17 comprises a closed cell portion 18, a cooled portion 19 wherein the temperature of the closed cell foamed plastic structure is reduced at least about 20° below its second order transition point or glass temperature, a crushed compacted and fractured zone 21 wherein the cooled portion 19 is compacted and the cell walls fractured between the rolls 13 and 14. Emerging from the rolls 13 and 14 is a foam structure **17*a* comprising an expanded open cellular portion 23 and the expanded closed cellular portion 18**.

In the practice of the method of the present invention it is essential that the thermoplastic resinous closed cellular or foamed material be flexible above the glass temperature to a sufficient degree to permit a desired degree of recovery after the foam has been crushed, and that the foam before being crushed be capable of maintaining its initial cellular integrity (i.e. the cells do not lose their individuality) when a sample of the foam is maintained at a temperature 50° C. above its glass temperature for a period of 15 minutes.

Foams which may be utilized in the practice of the present invention include polyurethane foams, polyvinyl halide foams, polyvinyl aromatic foams, such as polystyrene foams having sufficient cross linking to meet the foregoing physical requirements, polyolefin foams, and the like.

The term "polyolefin" includes polymers of ethylene, propylene and copolymers of ethylene and propylene either with each other or with other monomers such as, for example, those alpha-olefins having from 2 to 8 carbon atoms such as 1-butene, 1-pentene, 1-hexene, 1-heptene, 1-octene and mixed higher alpha-olefins. Other hydrocarbons useful for making copolymers with ethylene and propylene include divinylbenzene, allene, dimethallyl, and isopentene. Comonomers which can broadly be used include mono-substituted ethylenes such as 1-pentene, vinylcyclohexene, allyl benzene, $C_8$–$C_{14}$ mixed alpha-olefins, styrene, allyl naphthalene, and the like, 1,1-disubstituted ethylenes such as alpha-methyl styrene, 2-methyl-butene - 1, mixed alpha- and beta-pinenes, camphene and the like, 1,2-disubstituted ethylenes such as indene, acenaphthylene, cyclopentene, norbornylene, cyclohexene, trans-stilbene, 2-pentene and the like, conjugated dienes and trienes such as pentadiene-1,3, 1,2-dihydrobenzene, allocimene, and cyclopentadiene, unconjugated dienes such as mixed octadienes, hexadiene-1,5, 2,5-dimethyl-hexadiene-1,5, 1,4-dihydrobenzene, bicycloheptadiene, bicyclopentadiene, 4-vinylcyclohexene-1, and 4,7-diphenyl decadiene-1,9, acetylenes such as isopropenyl acetylene and phenyl acetylene, chloroolefins such as beta-methallyl chloride and chloromethyl norbornylene, and m-chlorostyrene, ethers and epoxides, esters such as vinyl butyrate, vinyl acetate, and methyl acrylate, and nitrogen compounds such as vinyl carbazole, 4-vinyl pyridine and acrylonitrile.

In essence, any synthetic resinous foam which is sufficiently resilient to re-expand or permit subsequent re-expansion thereof after being compressed to about 10 to about 25 percent of its initial thickness at a temperature above its second order transition point without collapse of the foam structure in the practice of the present invention with the further limitation that when the foam or a portion thereof is maintained at a temperature of about 20° centigrade or more below its second order transition temperature that it be sufficiently brittle that compression thereof fractures the cell walls to a degree sufficient to form an open celled structure and yet maintain the foam structure as a unitary body. Foams which are not operable in the present invention are those that do not have a second order transition point or glass temperature (*Tg*). Such foams are those that are highly crosslinked for example polyurethane foams which have a molecular weight of about 1000 or less between cross links are brittle and are destroyed by crushing regardless of temperature. Certain phenol-formaldehyde, urea-formaldehyde and epoxy resins foams have similar undesirable properties. Also inoperable are those foams which lose their cellular integrity when heated above their glass temperature.

It is possible in many cases to cool the foam to a temperature sufficiently low that on crushing the integrity of the body is destroyed and the resultant product is little more than a dust. Such conditions obviously represent a waste of material and refrigeration or cooling capacity. The precise degree of compression required of any given foam sheet or article varies with the proportion of the article which is to be made into an open celled foam, the relative rigidity of the cooled and uncooled portions, the rate of crushing, and the like. Such limitations for any particular foam plastic system are readily determined by those skilled in the art. Usually it is desirable to transfer the article from the temperature adjusting means to the crushing apparatus in as rapid a manner as possible to prevent the temperature of the cooler portion from rising above a temperature of about 20° centigrade below the second order transition point.

A wide variety of heating, refrigerating or cooling means may be employed. Beneficially, for optimum heat transfer and the selective cooling of a foam body, a liquid heat transfer medium is employed. The liquid utilized usually is substantially a non-solvent for the foam being cooled and is readily removed therefrom by evaporation or washing if a product is desired which is free from the cooling liquid. Advantageously foam structures are selectively cooled by subjecting to liquids such as liquefied gases at a suitable temperature and for a length of time sufficient to achieve the desired temperature. Particularly beneficial for heat treatment of such foams are liquid air and liquid nitrogen. Oftentimes liquid nitrogen is preferable because of its availability and low cost. Thermoplastic resinous foams will float upon the surface of liquid nitrogen and the thickness or depth of the foam which is cooled is readily controlled by the time of contact of the foam with the liquid cooling agent. In cases where the second order transition point of the foam body is above ambient temperature. The relative temperature of the portions of the foam body is readily adjusted by means of heated gases, liquid and the like, chosen to suit the particular plastic material employed. In many cases hot air and hot glycerol is beneficially employed.

Usually for most foams it is desirable to compress the foam to about 10 to about 25 percent of its original thickness to achieve cell rupture. Such compression usually must be restricted and not carried to the extreme wherein the cells of the warm foam, that is, the foam above about 20° below the second order transition temperature, are ruptured because of excessive gas pressures developed during compression.

Various configurations of open and closed cell foam are readily prepared in accordance with the method of the present invention by varying the temperature within the body. The invention hereinbefore has been discussed with the aspect of producing a two layer foam, that is, one in which one portion of the foamed plastic body has closed cells adjacent one surface and open cells adjacent the opposed surface. By employing suitable techniques, three layer foams and even four and five layer foams are readily generated. When a sheet of flexible foamed plastic material is maintained at a temperature below about 20° below its second order transition temperature, and the portions adjacent the surfaces thereof are raised to a temperature greater than the fracturing temperature or

*Tg* and the structure subsequently crushed, the resultant product is a foamed body having closed cells adjacent each of its major surfaces and open cells as a generally centrally disposed layer. The position of the centrally disposed layer is easily controlled by the selective warming of the outer surfaces prior to crushing, thus the open cell layer may be generated in substantially any position within the body. By retreating such a structure under suitably controlled conditions, a second layer of open cell foam is readily generated at any desired location within the body. In a manner utilizing the foregoing principles, desired combinations of open and closed cell foam is readily obtained from a unitary foamed plastic body.

By way of further illustration, a plurality of rectangular blocks of cellular polyethylene having a bulk density of about 1.5 pounds per cubic foot and measuring 4 x 4 x 1½ inches are placed on a surface of a quantity of liquid nitrogen and permitted to float for varying lengths of time. The blocks are then passed between a pair of pinch rolls which were spaced 0.125 inch apart in such a manner that the 1½ inch dimension is compacted to 0.125 inch. The resultant foam samples are then placed in an aqueous solution of a blue dye. Subsequently the blocks are sectioned to determine the depth to which the aqueous dye solution has penetrated. The results are set forth in the following table.

TABLE

| Sample No. | Time in minutes floated on liquid $N_2$ | Depth of dye penetration from surface, inch |
|---|---|---|
| 1 | 5 | 0.125 |
| 2 | 10 | 0.250 |
| 3 | 20 | 0.313 |
| 4 | 30 | 0.437 |

Foam blocks prepared in this manner are found especially useful for cleaning purposes wherein it is desired to have a sponge effect and a barrier to prevent penetration of the liquid from one side of the cleaning pad or sponge to the other and yet have a cleaning pad which is sufficiently rigid to maintain its form under the stresses of the application. Beneficially the porous or open celled portion of the foam has a compressive strength of about 1/20 of that of the closed cell portion which permits cleaning pads having a structure in accordance with the invention to conform to the various irregular configurations without exerting undue pressure on the portion of the article being cleaned extending furthest from the general plane of the article. Thus, polishing or abrasion of the high points or surfaces to an exaggerated extent is avoided. Two layer foam as prepared by the present invention is particularly advanageous and beneficial for upholstery purposes. Sheets of polyethylene foam having a thickness of about two inches, 1½ inches of which comprise a closed cell foam and the remaining half inch open celled foam is employed as padding in an automobile seat and is subsequently covered with a layer of 10 ounce duck is found to be more comfortable than a similar seat prepared utilizing a two inch thickness of closed cell foam. Persons comparing such seats find that the seat prepared utilizing the foam having a proportion of open cells provides a greater degree of comfort primarily because perspiration is much more rapidly removed than with the seat having all closed cell foam.

A portion of a closed cell flexible polyvinylchloride foam having a density of 5 pounds per cubic foot and measuring 4 x 4 x 1 inch was placed in liquid nitrogen for a period of 10 minutes. At the end of that time the foam was removed and maintained in an atmosphere of air at a temperature of about 25° centigrade for a period of 3 minutes. The foam sample was then compressed in the direction of the 1 inch dimension to a thickness of about 0.2 inch. After crushing, the foam sample was exposed to air until the sample attained room temperature. Examination of the foam indicated that each surface had a layer comprised of closed cells and the interior of the foam was predominantly open cell material.

A closed cell foam prepared from polyorthochlorostyrene and 0.11 weight percent divinylbenzene having a density of 3 pounds per cubic foot was shaped into a rectangular block 1 x 1 x 0.4 inch. This sample was heated for a period of 15 minutes in an air oven at a temperature of 150° centigrade. The sample was then removed from the oven and exposed to air at about 25° centigrade for a period of about 1 minute. The sample was immediately crushed in the 0.4 inch direction to a dimensions of 0.1 inch. The sample was then heated for a period of 15 minutes in an air oven at 150° centigrade whereupon the sample re-expanded to a thickness of about 0.25 inch. The treated sample was subjected to an aqueous dye solution. A centrally disposed layer in the sample measuring about 0.15 inch indicated that little or no dye was taken up, whereas the remaining 0.5 inch of foam on each side of the sample showed strong take-up of the dye solution indicating open cells. An untreated portion of foam did not color when treated with the dye.

A sample of the same orthochlorostyrene foam was treated in a similar manner with the exception that it was cooled for a period of only 30 seconds prior to crushing. Treatment with the dye solution indicated that substantially fewer cells adjacent the surface were ruptured. A third sample of the polyorthochlorostyrene foam was heated for three minutes in air at 150° centigrade and immediately crushed to 0.1 inch and subsequently reheated for 5 minutes at 150° centigrade and cooled to room temperature. Treatment with aqueous dye solution indicated that the inner half of the sample was of open celled construction, whereas the remaining layers adjacent the surface were of closed cell construction.

Repetition of the foregoing illustrations employing polyorthochlorostyrene foams with foams prepared by polymerizing methylmethacrylate with 0.10 weight percent divinylbenzene and having a density of about 2 pounds per cubic foot provided similar results.

A sample of a foam prepared from isotactic polystyrene having a density of 2 pounds per cubic foot and measuring 1 x 1 x ½ inch was heated to a temperature of 120° centigrade for a period of 15 minutes by means of an air oven. The foam sample was cooled for a period of 1 minute in air at a temperature of about 24° centigrade and crushed in the direction of the half inch dimension to a thickness of about 0.1 inch. The crushed foam was reheated for a period of 10 minutes at 120° centigrade in air and subsequently cooled to room temperature. The foam sample was treated with an aqueous dye solution which readily penetrated the outer portion of the foam but was not taken up by the central portion of the sample.

In a manner similar to the foregoing examples, foam bodies having selective open celled portions are readily prepared from foamed polyethylene, foamed polypropylene, foamed polybutene-1, foamed polyisobutylene, resinous copolymers of ethylene and propylene, natural rubber, styrenebutadiene rubber, chlorosulfonated polyethylene, polyvinylidene chloride, polyethyl acrylate, polybutyl acrylate, polyethylmethacrylate, polyvinyl ether, polytertiarybutylstyrene, and the like, and other polymeric foams which exhibit a second order transition point or glass temperature and maintain as do the foams of the examples their initial cellular integrity for a period of 15 minutes when heated to a temperature 50° centigrade above their glass temperature.

In a manner similar to the foregoing illustrations, similar beneficial and advantageous results are achieved utilizing closed cell flexible polyurethane foam having a bulk density of about 2 pounds per cubic foot, flexible foamed natural rubber having a bulk density of about 5 pounds per cubic foot, polypropylene foam having a bulk density of about 1.25 pounds per cubic foot, a foam having a density of about 3 pounds per cubic foot prepared from 40 parts of styrene and 60 parts by weight of butadiene, and the like.

As is apparent from the foregoing specification, the method and article of the present invention are susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, excepting as it is set forth and defined in the hereto appended claims.

What is claimed is:

1. A cellular thermoplastic resinous shaped article having a second order transition point, the article comprising a unitary body of substantially like composition throughout, the body having a first layer of closed cellular structure and an adjacent second layer of open cellular structure, the configuration of the adjacent cells of the open and closed layers being substantially identical with the exception that in the open cell region the walls of the cells are fractured.

2. The article of claim 1 wherein the foam cellular article is a polyolefin.

3. The article of claim 2 wherein the polyolefin is polyethylene.

4. The article of claim 1 having a generally sheet-like configuration and the open celled portion extending inwardly from one of the major surfaces of the sheet and the closed cell portion extending inwardly from the opposite face of the sheet.

5. A method for preparing a thermoplastic resinous article having open cells in a first portion thereof and closed cells in a second portion thereof, the method comprising providing a foamed resinous body having a closed cell structure, a first portion, a second portion and a second order transition point, the temperature of at least the first portion of the resinous foamed body having cell walls having a temperature at least 20° C. below its second order transition point or glass temperature;

compressing the body and rupturing cell walls of the first portion of the foam body while maintaining the second portion of the body above its second order transition point and not rupturing a major portion of the cell walls thereof.

6. The method of claim 5 wherein the crushing is accomplished by compressing the foam to about 10 to about 25 percent of its original thickness.

7. The method of claim 6 wherein the thermoplastic resinous material is a polyethylene foam.

8. The method of claim 5 including the step of contacting at least a portion of one surface thereof with a liquid heat transfer medium prior to compressing the body.

9. The method of claim 8 wherein the liquid heat transfer medium is liquid nitrogen.

References Cited

UNITED STATES PATENTS

| | | | |
|---|---|---|---|
| 1,045,234 | 11/1912 | Willis et al. | 246—321 X |
| 3,171,820 | 3/1965 | Volz | 264—321 X |
| 3,175,025 | 3/1965 | Green et al. | 264—80 |
| 3,196,975 | 7/1965 | Voelker | 264—321 X |
| 3,239,585 | 3/1966 | Karpovich et al. | 264—321 X |
| 3,240,855 | 3/1966 | Voelker | 264—321 |
| 3,297,803 | 1/1967 | Meisel et al. | 264—84 |
| 3,300,558 | 1/1967 | Grant et al. | 264—321 |

FOREIGN PATENTS

| | | |
|---|---|---|
| 625,060 | 8/1961 | Canada. |
| 884,322 | 12/1961 | Great Britain. |

ALEXANDER H. BRODMERKEL, *Primary Examiner.*

P. E. ANDERSON, *Assistant Examiner.*